United States Patent
Mizoguchi

(10) Patent No.: US 10,800,451 B2
(45) Date of Patent: Oct. 13, 2020

(54) VEHICLE DRIVE ASSIST APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 200 days.

(21) Appl. No.: 16/033,837

(22) Filed: Jul. 12, 2018

(65) Prior Publication Data

US 2019/0061808 A1 Feb. 28, 2019

(30) Foreign Application Priority Data

Aug. 25, 2017 (JP) .................................. 2017-162240

(51) Int. Cl.
  *B62D 6/02* (2006.01)
  *B62D 6/00* (2006.01)
  (Continued)

(52) U.S. Cl.
  CPC ............. *B62D 6/003* (2013.01); *B60W 30/12* (2013.01); *B60W 30/14* (2013.01);
  (Continued)

(58) Field of Classification Search
  CPC .... B60W 30/12; B60W 30/14; B60W 40/105; B62D 15/025; B62D 15/026; B62D 6/003; B62D 6/02; G01C 21/26; G08G 1/167
  See application file for complete search history.

(56) References Cited

U.S. PATENT DOCUMENTS

| | | | |
|---|---|---|---|
| 2002/0095246 A1* | 7/2002 | Kawazoe | B62D 15/025 701/1 |
| 2004/0215393 A1* | 10/2004 | Matsumoto | B60T 8/17557 701/300 |

(Continued)

FOREIGN PATENT DOCUMENTS

| | | |
|---|---|---|
| JP | 07-110712 A | 4/1995 |
| JP | 10-002954 A | 1/1998 |

(Continued)

OTHER PUBLICATIONS

Japanese Office Action issued in corresponding Japanese Patent Application No. 2017-162240, dated Apr. 2, 2019, with English Translation.

*Primary Examiner* — Tyler J Lee
(74) *Attorney, Agent, or Firm* — McDermott Will & Emery LLP

(57) ABSTRACT

A vehicle drive assist apparatus includes an own vehicle position estimator, a storage, a traveling lane estimator, a target steering angle setting unit, an own vehicle speed detector, and a lateral position deviation calculator. The own vehicle position estimator estimates an own vehicle position, by receiving a positioning signal from a positioning information transmitter. The traveling lane estimator estimates a traveling lane, by referring to road map information stored in the storage and based on the estimated own vehicle position. The lateral position deviation calculator sets a lateral position deviation being an offset amount in a lateral direction. The target steering angle setting unit sets a target steering angle based on the estimated traveling lane, adds the lateral position deviation to a feedback term of the target steering angle, and sets, based on an addition result, the target steering angle allowing an own vehicle to travel along the traveling lane.

11 Claims, 11 Drawing Sheets

(51) Int. Cl.
  *B60W 40/105* (2012.01)
  *B62D 15/02* (2006.01)
  *B60W 30/14* (2006.01)
  *B60W 30/12* (2020.01)
  *G08G 1/16* (2006.01)
  *G01C 21/26* (2006.01)
(52) U.S. Cl.
  CPC ............. *B60W 40/105* (2013.01); *B62D 6/02* (2013.01); *B62D 15/025* (2013.01); *B62D 15/026* (2013.01); *G01C 21/26* (2013.01); *G08G 1/167* (2013.01)

(56) References Cited

U.S. PATENT DOCUMENTS

| | | | |
|---|---|---|---|
| 2009/0287376 A1* | 11/2009 | Aso | B60W 10/12 701/42 |
| 2015/0307095 A1 | 10/2015 | Aso | |
| 2016/0052544 A1* | 2/2016 | Ueda | B62D 15/025 701/25 |
| 2016/0280262 A1 | 9/2016 | Oyama | |

FOREIGN PATENT DOCUMENTS

| | | |
|---|---|---|
| JP | 2008-168782 A | 7/2008 |
| JP | 2015-210720 A | 11/2015 |
| JP | 2016-043697 A | 4/2016 |
| JP | 2016-181015 A | 10/2016 |
| JP | 2017-013586 A | 1/2017 |
| JP | 2017-047799 A | 3/2017 |

* cited by examiner

VEHICLE DRIVE ASSIST APPARATUS

CROSS-REFERENCE TO RELATED APPLICATIONS

The present application claims priority from Japanese Patent Application No. 2017-162240 filed on Aug. 25, 2017, the entire contents of which are hereby incorporated by reference.

BACKGROUND

The technology relates to a vehicle drive assist apparatus.

A vehicle is often equipped with various drive assist apparatuses in order to reduce burden on a driver related to driving during traveling. One of controls performed in such drive assist apparatuses is a lane keep assist control that allows an own vehicle to travel along a traveling lane.

As the lane keep assist control, so-called radio navigation has been known. In the radio navigation, a position of an own vehicle is recognized on the basis of position information obtained from a global navigation satellite system (GNSS) satellite typified by a global positioning system (GPS) satellite. The position of an own vehicle is hereinafter referred to as the own vehicle position. The recognized own vehicle position is subjected to map-matching with road map information, thereby allowing the own vehicle position to be specified on the road map. This specifies a traveling lane on the basis of the map information on the road in the vicinity of the own vehicle to allow the own vehicle to travel along the lane. In accordance with the radio navigation, it is possible to perform, for example, automatic driving that sets a traveling lane for the own vehicle to a destination on the basis of the road map information, and guides the own vehicle to the destination along the traveling lane for the own vehicle.

However, an error is included in the own vehicle position to be recognized on the basis of the position information obtained from the GNSS satellite. Accordingly, there is a limit to the lane keep assist control performed by the automatic driving using only the radio navigation. Hence, in some cases, a front recognizer recognizes a lane ahead of the own vehicle to perform a feedback control to allow the own vehicle to travel in the middle of the traveling lane. In such cases, in a situation of a snowy road, or when lane lines that partition a traveling lane are concealed by factors such as, but not limited to, snow that is stacked on a road shoulder as a result of snow removal, or when the lane lines are blurred, the lane lines are difficult to recognize or unrecognizable by the front recognizer. This results in erroneous recognition of the lane lines, causing the lane keep assist control to be temporarily cancelled.

In this case, when right and left white lines, i.e., right and left lane lines are difficult to recognize or unrecognizable by the front recognizer even in a state where a driver recognizes that the own vehicle is traveling in the middle of the lane, the cancellation of the lane keep assist control may cause not only burden, but also discomfort and troublesomeness to the driver.

To address this, for example, Japanese Unexamined Patent Application Publication (JP-A) No. 2017-13586 discloses a technique of continuing a lane keep assist control. In the disclosed technique, in a case where a steering override performed by a driver is detected during a traveling control such as the automatic driving, determination is made that the driver performs an operation of returning an own vehicle to the middle of the lane. Further, presumption is made that the own vehicle position is in the middle of the lane at a time when an end of the steering override is detected. This allows for continuation of the lane keep assist control using, as an origin, the own vehicle position at a time when the steering override is ended.

SUMMARY

An aspect of the technology provides a vehicle drive assist apparatus that includes an own vehicle position estimator, a storage, a traveling lane estimator, a target steering angle setting unit, an own vehicle speed detector, and a lateral position deviation calculator. The own vehicle position estimator is configured to estimate an own vehicle position that is a position of an own vehicle, by receiving a positioning signal supplied from a positioning information transmitter. The storage stores road map information. The traveling lane estimator is configured to estimate a traveling lane along which the own vehicle travels, by referring to the road map information stored in the storage and on a basis of the own vehicle position estimated by the own vehicle position estimator. The target steering angle setting unit is configured to set a target steering angle on a basis of the traveling lane estimated by the traveling lane estimator. The target steering angle allows the own vehicle to travel along the traveling lane. The own vehicle speed detector is configured to detect an own vehicle speed of the own vehicle. The lateral position deviation calculator is configured to set a lateral position deviation on a basis of an external factor related to lane traveling. The lateral position deviation is an offset amount in a lateral direction orthogonal to an advancing direction of the own vehicle. The lateral position deviation is to be added to a feedback term of the target steering angle. The target steering angle setting unit is configured to add the lateral position deviation to the feedback term of the target steering angle, and set, on a basis of a result of the addition, the target steering angle to allow the own vehicle to travel along the traveling lane.

An aspect of the technology provides a vehicle drive assist apparatus that includes a storage, an own vehicle speed detector, and circuitry. The storage stores road map information. The own vehicle speed is configured to detector detect an own vehicle speed of an own vehicle. The circuitry is configured to estimate an own vehicle position that is a position of the own vehicle, by receiving a positioning signal supplied from a positioning information transmitter. The circuitry is configured to estimate a traveling lane along which the own vehicle travels, by referring to the road map information stored in the storage on a basis of the estimated own vehicle position. The circuitry is configured to set a target steering angle on a basis of the estimated traveling lane. The target steering angle allows the own vehicle to travel along the traveling lane. The circuitry is configured to set a lateral position deviation on a basis of an external factor related to lane traveling. The lateral position deviation is an offset amount in a lateral direction orthogonal to an advancing direction of the own vehicle. The lateral position deviation is to be added to a feedback term of the target steering angle. The circuitry is configured to add, upon the setting of the target steering angle, the lateral position deviation to the feedback term of the target steering angle, and set, on a basis of a result of the addition, the target steering angle that allows the own vehicle to travel along the traveling lane.

DETAILED DESCRIPTION

Figure 1:
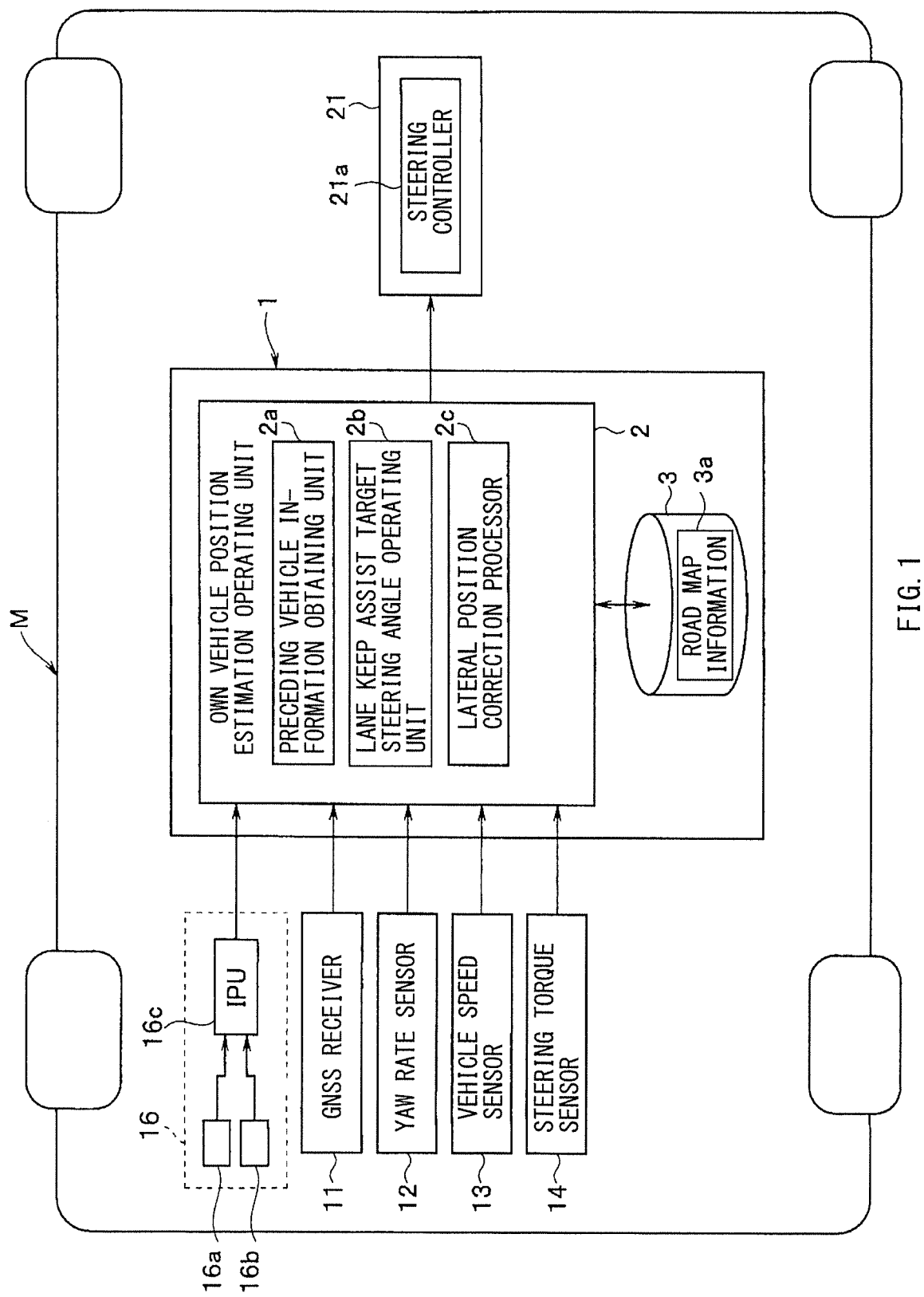
FIG. 1 is a configuration diagram illustrating an example of an overall schematic configuration of a vehicle drive assist apparatus according to one implementation.

In the following, some implementations of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In a technique disclosed in JP-A No. 2017-13586, in a case where right and left lane lines become difficult to recognize or unrecognizable by a front recognizer, it is necessary for a driver to constantly keep a close watch on the front to constantly monitor shift in a lateral position of an own vehicle, thus resulting in a possibility that the driver may not be able to relax even during traveling under a lane keep assist control.

Moreover, a difference is indistinguishable between a steering override resulting from a lane change, etc. and an override for correction of an advancing course of the own vehicle to the middle of a lane. In the former case, it may be necessary to reduce reaction force applied to a steering wheel by temporarily cancelling the lane keep assist control. In the technique disclosed in JP-A No. 2017-13586, however, the reaction force applied to the steering wheel continues until the steering override is ended, thus resulting in a possibility that burden on the driver may be increased.

It is desirable to provide a vehicle drive assist apparatus that allows for continuation of a lane keep assist control without imposing burden on a driver even in a circumstance where right and left lane lines are difficult to recognize or unrecognizable by a front recognizer.

[First Implementation]

FIGS. 1 to 11 each illustrate a first implementation of the technology. A vehicle drive assist apparatus illustrated in FIG. 1 may be mounted on an own vehicle M. The vehicle drive assist apparatus may include an own vehicle position estimation device 1 and a steering control unit 21. The own vehicle position estimation device 1 may include an own vehicle position estimation operating unit 2 and a high-accuracy road map database 3. In one implementation, the own vehicle position estimation operating unit 2 may serve as an "own vehicle position estimator", and the high-accuracy road map database 3 may serve as a "storage". The own vehicle position estimation operating unit 2 and the steering control unit 21 may be each configured by a known microcomputer and its peripherals. The known microcomputer may include components such as, but not limited to, a central processing unit (CPU), a random access memory (RAM), and a read only memory (ROM). The ROM may store, in advance, a fixed data, for example, such as a program and a base map. The program may be executed by the CPU.

Sensors such as a GNSS receiver 11, a yaw rate sensor 12, a vehicle speed sensor 13, a steering torque sensor 14, or a camera unit 16 may be coupled to an input side of the own vehicle position estimation operating unit 2. The sensors may be necessary when estimating a position of an own vehicle and allowing the own vehicle M to travel along a traveling lane. The GNSS receiver 11 may receive positioning signals transmitted by a plurality of positioning satellites. The yaw rate sensor 12 may detect a yaw rate Yawr [rad/sec] that acts on the own vehicle M. The vehicle speed sensor 13 may detect a vehicle speed of the own vehicle M, i.e., an own vehicle speed V [m/sec]. The steering torque sensor 14 may detect shaft torque that acts on a steering shaft. In one implementation, the vehicle speed sensor 13 may serve as an "own vehicle speed detector".

The camera unit 16 may be fixed at an upper middle part inside a front cabin. The camera unit 16 may include a stereo camera configured by a main camera 16*a* and a sub camera 16*b*, and an image processing unit (IPU) 16*c*. The main camera 16*a* and the sub camera 16*b* may be disposed at positions bilaterally symmetrical with respect to the middle in a vehicle-width direction. In the camera unit 16, the IPU 16*c* may perform a predetermined image processing on the basis of information on front images ahead of the own vehicle M. The front images may be captured by the main camera 16*a* and the sub camera 16*b*. The IPU 16*c* may thereafter transmit the resulting processed images to the own vehicle position estimation operating unit 2.

The steering control unit 21 may be coupled to an output side of the own vehicle position estimation operating unit 2. The steering control unit 21 may execute a steering control, i.e., a lane keep assist control that allows the own vehicle M to travel along the traveling lane in automatic driving, for example. In a specific but non-limiting example, the steering control unit 21 may perform a lateral position control on the basis of a feedback signal supplied from the own vehicle position estimation device 1. The lateral position control may be directed to allowing the own vehicle M to travel along a target advancing course set in the middle of the lane.

The high-accuracy road map database 3 may be stored in a mass storage medium such as, but not limited to, a hard disk drive (HDD). The high-accuracy road map database 3 may include high-accuracy road map information (i.e., a dynamic map) 3*a*. Lane data necessary for performing automatic driving are set in the high-accuracy road map information 3*a* for each several-meter interval along each of lanes on the road map. Non-limiting examples of the lane data may include data concerning a lane width, a lane middle position coordinate, advancing azimuth of lane, and a speed limit.

The own vehicle position estimation operating unit 2 may serve to estimate a position of the own vehicle M and perform map-matching of the estimated position of the own vehicle M on the road map to allow the own vehicle M to travel in accordance with so-called radio navigation. The own vehicle position estimation operating unit 2 may include a preceding vehicle information obtaining unit 2*a*, a lane keep assist target steering angle operating unit 2*b*, and a lateral position correction processor 2*c*. In one implementation, the preceding vehicle information obtaining unit 2*a*, the lane keep assist target steering angle operating unit 2*b*, and the lateral position correction processor 2*c* may serve, respectively, as a "preceding vehicle information obtaining unit", a "target steering angle setting unit", and a "lateral position deviation calculator".

Figure 10:
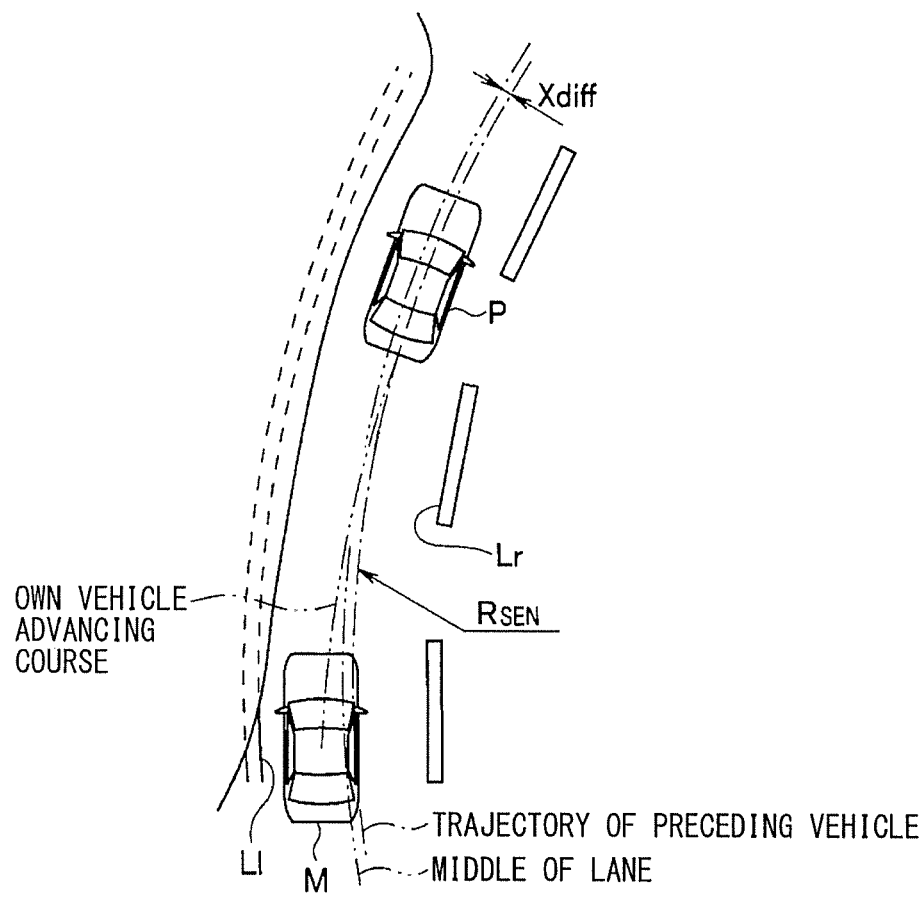
FIG. 10 describes an example of the lateral position correction of the lane keep assist control based on following of a preceding vehicle.

The preceding vehicle information obtaining unit 2*a* may check whether a preceding vehicle P to be followed illustrated in FIG. 10 is traveling ahead on a traveling lane, i.e., an own vehicle advancing course along which the own vehicle M travels. The checking may be performed by the preceding vehicle information obtaining unit 2*a* on the basis of the information on the front images ahead of the own vehicle M which are captured by the camera unit 16. The preceding vehicle information obtaining unit 2*a* may recognize the preceding vehicle P in accordance with a known template matching method, for example.

In a case where the preceding vehicle P to be followed is detected, the preceding vehicle information obtaining unit 2*a* may obtain a traveling trajectory of the preceding vehicle P as preceding vehicle information. Note that, in the traveling in which the preceding vehicle P is followed, the traveling trajectory may be an external factor related to lane traveling of the own vehicle M.

Figure 9:
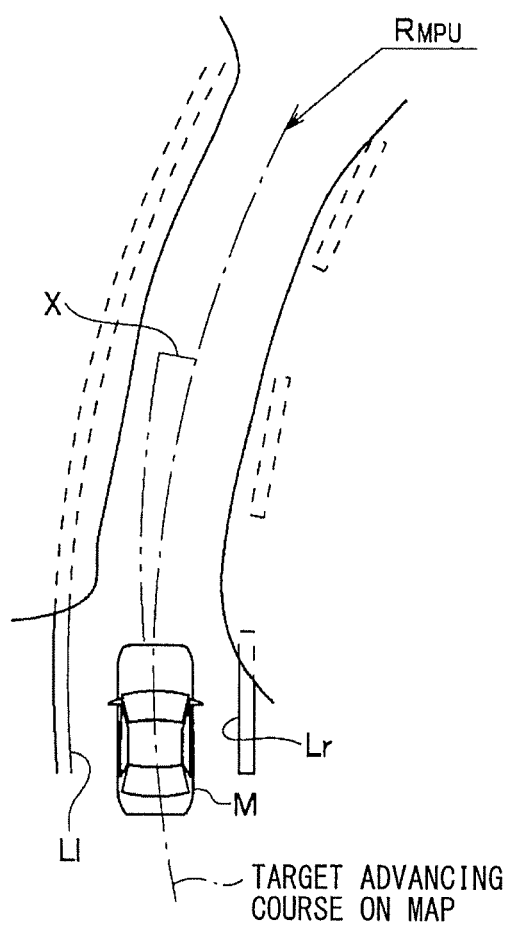
FIG. 9 describes an example of a lane keep assist control in a state where right and left lane lines are concealed.

For example, as illustrated in FIG. 9, in a case where it is difficult to recognize right and left lane lines L, i.e., a right lane line Lr and a left lane line Ll on the basis of the above-described information on the front images, the preceding vehicle information obtaining unit 2*a* may obtain the traveling trajectory of the preceding vehicle P as a parameter for correction of the target advancing course of the own vehicle M. The difficulty in recognizing the right and left lane lines L may result, for example, from influences such as snowfall that conceals the right and left lane lines L or deterioration of the right and left lane lines L that causes blurring thereof. The right and left lane lines L may partition, on the right and on the left, the traveling lane along which the own vehicle M travels.

The lane keep assist target steering angle operating unit 2*b* may determine a target steering angle δT. The target steering angle δT may be used to execute the lane keep assist control that allows the own vehicle M to travel along the traveling lane. For example, a position of the own vehicle may be determined on the basis of positioning signals that are transmitted by the plurality of positioning satellites and received by the GNSS receiver 11. In one implementation, the plurality of positioning satellites may serve as a "positioning information transmitter". The lane keep assist target steering angle operating unit 2*b* may specify a position of the own vehicle on the road map information on the basis of the positioned own vehicle position. The lane keep assist target steering angle operating unit 2*b* may thereafter determine a steering angle that allows for traveling along the target advancing course set in the middle of the traveling lane on the road map, and set the determined steering angle as the target steering angle δT. This method is referred to as the radio navigation.

In this situation, in a case where the right and left lane lines L that partition the traveling lane of the own vehicle M are recognized on the basis of the information on the front images captured by the camera unit 16, the lane keep assist target steering angle operating unit 2*b* may set the target steering angle δT. The lane keep assist target steering angle operating unit 2*b* may set the target steering angle δT by subjecting the steering angle set on the basis of the road map to lateral position correction to allow the own vehicle M to travel in the middle of the traveling lane, i.e., the middle of the lane interposed between the right lane line Lr and the left lane line Ll. The recognition of the right and left lane lines L by the camera unit 16 may be performed, for example, by detecting the right and left lane lines L by means of binarization processing on the basis of luminance difference between the road and each of the right and left lane lines L. The detection of the right and left lane lines L by means of the binarization processing may be followed by performing curve approximation of the right and left lane lines L in an advancing direction by means of a least square method. In an alternative example implementation, it is also possible to use methods such as Hough transform and template matching to recognize the right and left lane lines L.

Meanwhile, in a case where the right and left lane lines L are difficult to recognize or unrecognizable on the basis of the information on the front images due to influences such as, but not limited to, snow and blurring and where the preceding vehicle information is not obtained by the above-described preceding vehicle information obtaining unit 2*a*, the own vehicle position estimation device 1 and the steering control unit 21 may execute the lane keep assist control by means of the above-described radio navigation. In a case where the right and left lane lines L are difficult to recognize or unrecognizable and where the preceding vehicle information is obtained, the own vehicle position estimation device 1 and the steering control unit 21 may determine, on the basis of a traveling trajectory of the preceding vehicle P, a curvature of the traveling trajectory, i.e., a preceding vehicle curvature RSEN. In accordance with a difference between the determined preceding vehicle curvature RSEN and a curvature of the road along which the own vehicle M travels on the map, i.e., a map curvature RMPU, the own vehicle position estimation device 1 and the steering control unit 21 may subject the steering angle set by means of the radio navigation to the lateral position correction to set the target steering angle δT. The own vehicle position estimation device 1 and the steering control unit 21 may thereby execute the lane keep assist control that allows the own vehicle M to follow the preceding vehicle P.

Figure 2:
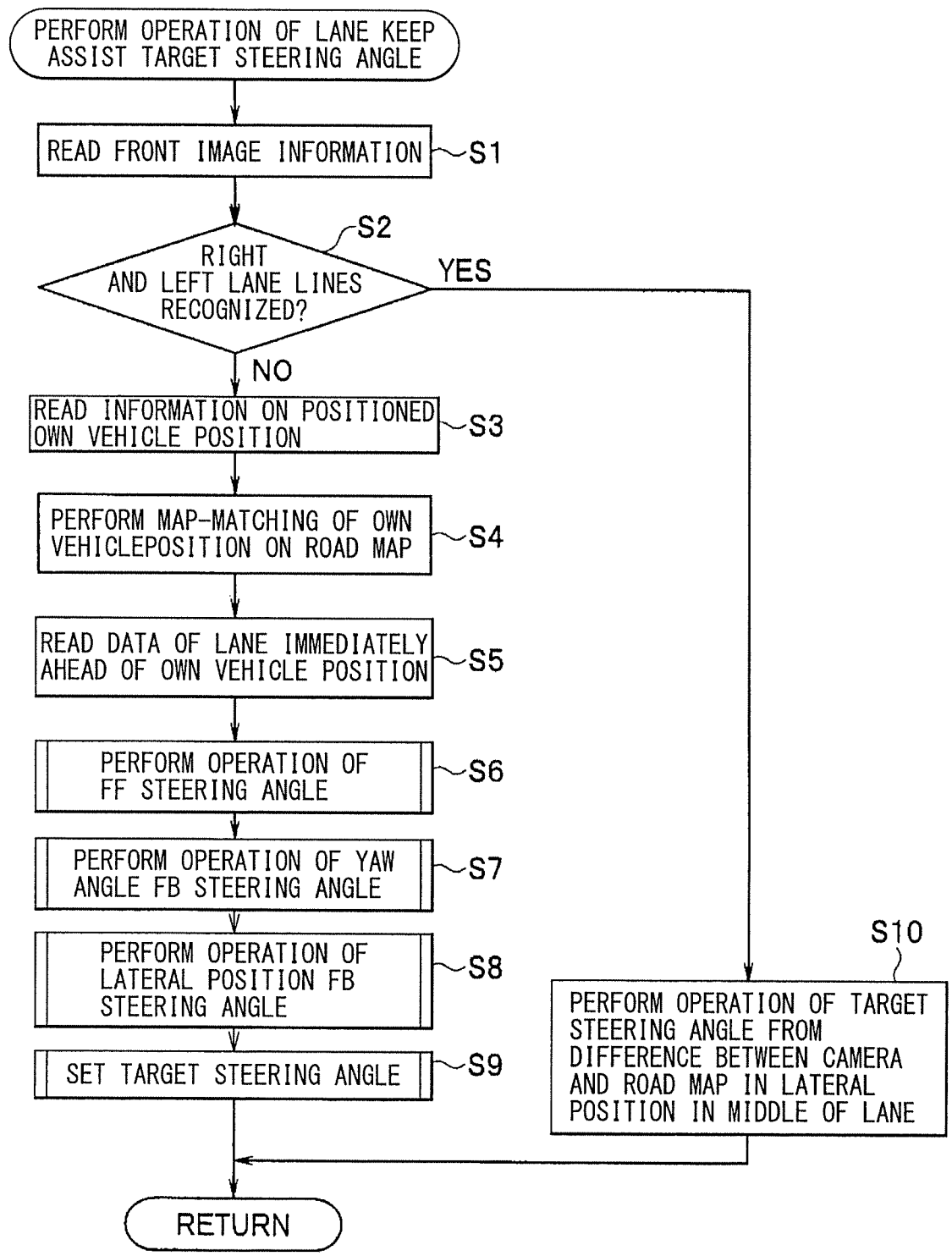
FIG. 2 is a flowchart illustrating an example of an operation routine of a lane keep assist target steering angle.

In a specific but non-limiting example, the above-described target steering angle δT set by the lane keep assist target steering angle operating unit 2*b* may be determined in accordance with an operation routine of a lane keep assist target steering angle illustrated in FIG. 2.

In this routine, the own vehicle position estimation operating unit 2 may first, in step S1, read the information on the front images captured by the camera unit 16. In step S2, the own vehicle position estimation operating unit 2 may check whether the right and left lane lines L are recognized. The right and left lane lines L partition, on the right and on the left, the traveling lane along which the own vehicle M travels. In a case where the right and left lane lines L are not recognized, i.e., in a case of "NO" in step S2, the flow may proceed to step S3. In a case where the right and left lane lines L are recognized, i.e., in a case of "YES" in step S2, the flow may jump to step S10.

In step S10, the own vehicle position estimation operating unit 2 may subject the steering angle set by means of the radio navigation to the lateral position correction. Subjecting the steering angle to the lateral position correction may be performed in accordance with a difference in lateral positions between the middle of a lane on the road map and the middle of a lane calculated on the basis of a lane width between the right and left lane lines obtained from the information on the front images. The own vehicle position estimation operating unit 2 may thereby calculate the target steering angle δT to exit the routine.

Meanwhile, when the flow proceeds to step S3, the own vehicle position estimation operating unit 2 may read information on a position of the own vehicle determined on the basis of the positioning signals received by the GNSS receiver 11. In step S4, the own vehicle position estimation operating unit 2 may perform map-matching of the position of the own vehicle on the road map. Thereafter, when the flow proceeds to step S5, the own vehicle position estimation operating unit 2 may read, from the road map information 3a, lane data immediately ahead of the own vehicle on the basis of the specified position of the own vehicle on the road map. Non-limiting examples of the lane data may include a map curvature and an advancing direction. Note that, in one implementation, the processings in the steps S3 to S5 may correspond to those of a "traveling lane estimator".

Thereafter, in step S6, the own vehicle position estimation operating unit 2 may perform an operation processing of a feedforward (FF) steering angle. In step S7, the own vehicle position estimation operating unit 2 may perform an operation processing of a yaw angle feedback (FB) steering angle that is a yaw angle feedback term of a target steering angle. Further, in step S8, the own vehicle position estimation operating unit 2 may perform an operation processing of a lateral position FB steering angle that is a lateral position feedback term of a target steering angle. Thereafter, in step S9, the target steering angle δT may be set.

[Operation Processing of FF Steering Angle]

Figure 3:
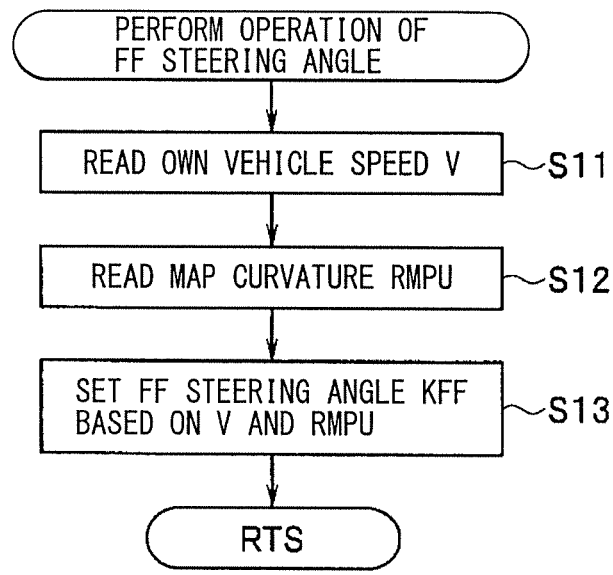
FIG. 3 is a flowchart illustrating an example of an operation sub-routine of a feedforward (FF) steering angle.

The operation processing of the FF steering angle in step S6 may be performed in accordance with an operation sub-routine of the FF steering angle illustrated in FIG. 3. In this sub-routine, the own vehicle position estimation operating unit 2 may first, in step S11, read the own vehicle speed V detected by the vehicle speed sensor 13. Thereafter, in step S12, the own vehicle position estimation operating unit 2 may read, from the road map information 3a, the map curvature RMPU of the lane data immediately ahead of the position of the own vehicle on the road map.

In step S13, the own vehicle position estimation operating unit 2 may set a FF steering angle KFF on the basis of the own vehicle speed V and the map curvature RMPU. When the flow proceeds to step S7 in FIG. 2, the own vehicle position estimation operating unit 2 may execute an operation processing of a yaw angle FB steering angle.

Figure 7:
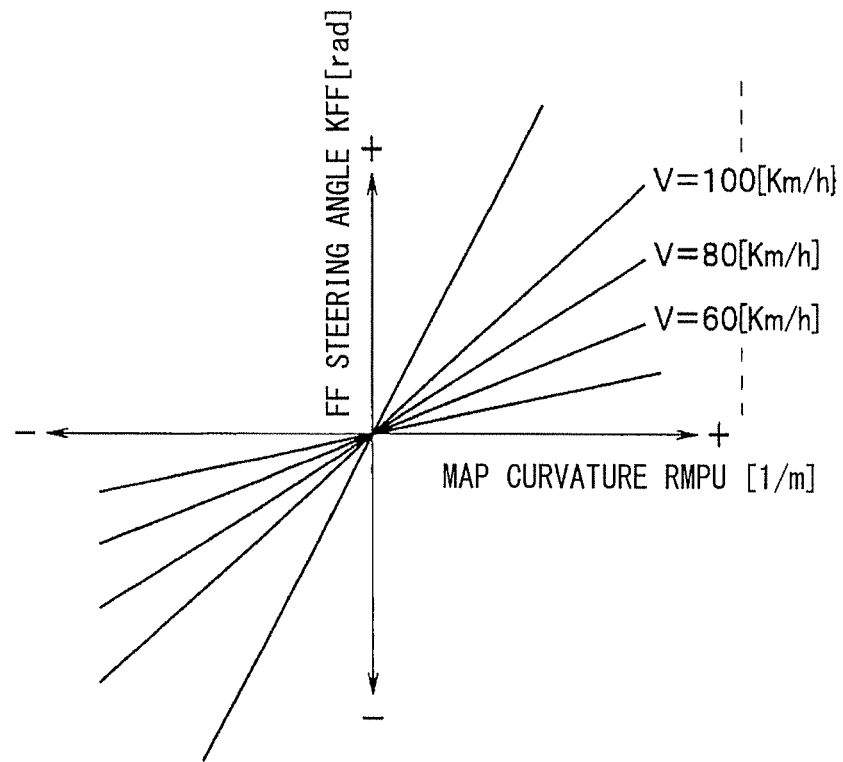
FIG. 7 describes an example of a concept of a base map of the FF steering angle.

The FF steering angle KFF may be set, for example, by referring to a base map of the FF steering angle illustrated in FIG. 7. In the base map of the FF steering angle, the map curvature RMPU and the FF steering angle KFF may be set substantially proportional to each other, with the own vehicle speed V as a parameter. In this case, the FF steering angle KFF may be determined from a calculation formula. For example, a yaw rate, that is equal to (=) V·RMPU, may be first calculated on the basis of the own vehicle speed V and the map curvature RMPU, and the steering angle KFF may be calculated from an inverse model formula of a model formula indicating a relationship between the steering angle and the yaw rate. Note that, in FIG. 7, a unit of the own vehicle speed V is represented as [Km/h] for the sake of convenience.

[Operation Processing of Yaw Angle FB Steering Angle]

Figure 4:
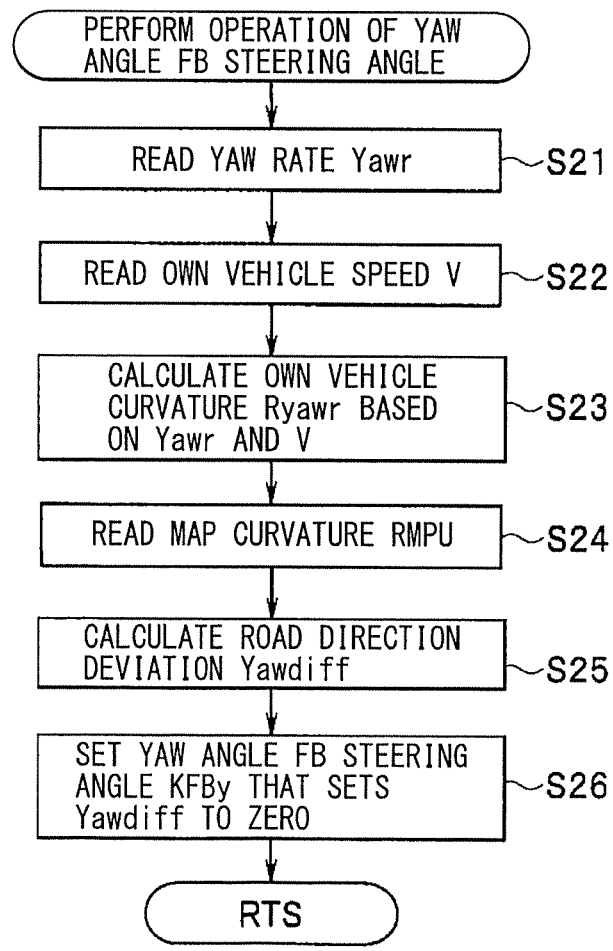
FIG. 4 is a flowchart illustrating an example of an operation sub-routine of a yaw angle feedback (FB) steering angle.

The operation processing of the yaw angle FB steering angle in step S7 of FIG. 2 may be executed in accordance with an operation sub-routine of the yaw angle FB steering angle illustrated in FIG. 4. In this sub-routine, the own vehicle position estimation operating unit 2 may first, in step S21, read the yaw rate Yawar detected by the yaw rate sensor 12. In step S22, the own vehicle position estimation operating unit 2 may read the own vehicle speed V detected by the vehicle speed sensor 13.

Thereafter, in step S23, the own vehicle position estimation operating unit 2 may divide the yaw rate Yawr by the own vehicle speed V to calculate a turning curvature of the own vehicle M, i.e., an own vehicle curvature Ryawr (i.e., Ryawr←Yawr/V). As used herein, the symbol "←" refers to determining a parameter on the left side by performing a calculation on the basis of a formula on the right side. When the flow proceeds to step S24, the own vehicle position estimation operating unit 2 may read the map curvature RMPU from lane data of a road along which the own vehicle M travels. Note that, in one implementation, the processing in this step S23 may correspond to that of an "own vehicle curvature calculator".

Figure 8:
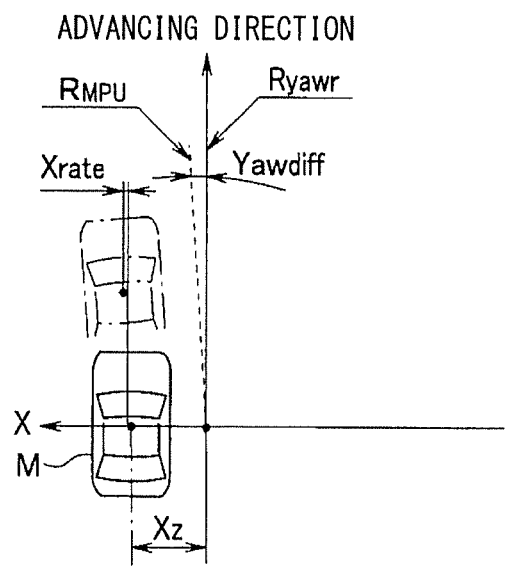
FIG. 8 describes an example of a lateral movement amount of an own vehicle from the middle of a lane on a map and an example of an amount of variation in a lateral position between an own vehicle curvature and a map curvature.

In step S25, the own vehicle position estimation operating unit 2 may calculate a road direction deviation, i.e., an estimated yaw angle deviation Yawdiff [rad], as illustrated in FIG. 8, using the following expression:

$$Yawdiff \leftarrow \int V \cdot Ts \cdot (RMPU - Ryawr)dt$$

where Ts denotes a sampling period, i.e., an operation period. The own vehicle position estimation operating unit 2 may perform calculation on the basis of an angle generated by a difference, i.e., a curvature difference between the map curvature RMPU and the own vehicle curvature Ryawr. In other words, the calculation may be performed on the basis of a deviation in an orientation of the own vehicle M caused by the difference between the own vehicle curvature Ryawr and the map curvature RMPU.

Thereafter, when the flow proceeds to step S26, the own vehicle position estimation operating unit 2 may set the yaw angle FB steering angle KFBy by means of a method such as a known proportional integral differential (PID) control, for example. The yaw angle FB steering angle KFBy may be used to set a road direction deviation Yawdiff to zero (0). Thereafter, when the flow proceeds to step S8 in FIG. 2, the own vehicle position estimation operating unit 2 may execute the operation processing of the lateral position FB steering angle.

[Operation Processing of Lateral Position FB Steering Angle]

Figure 5:
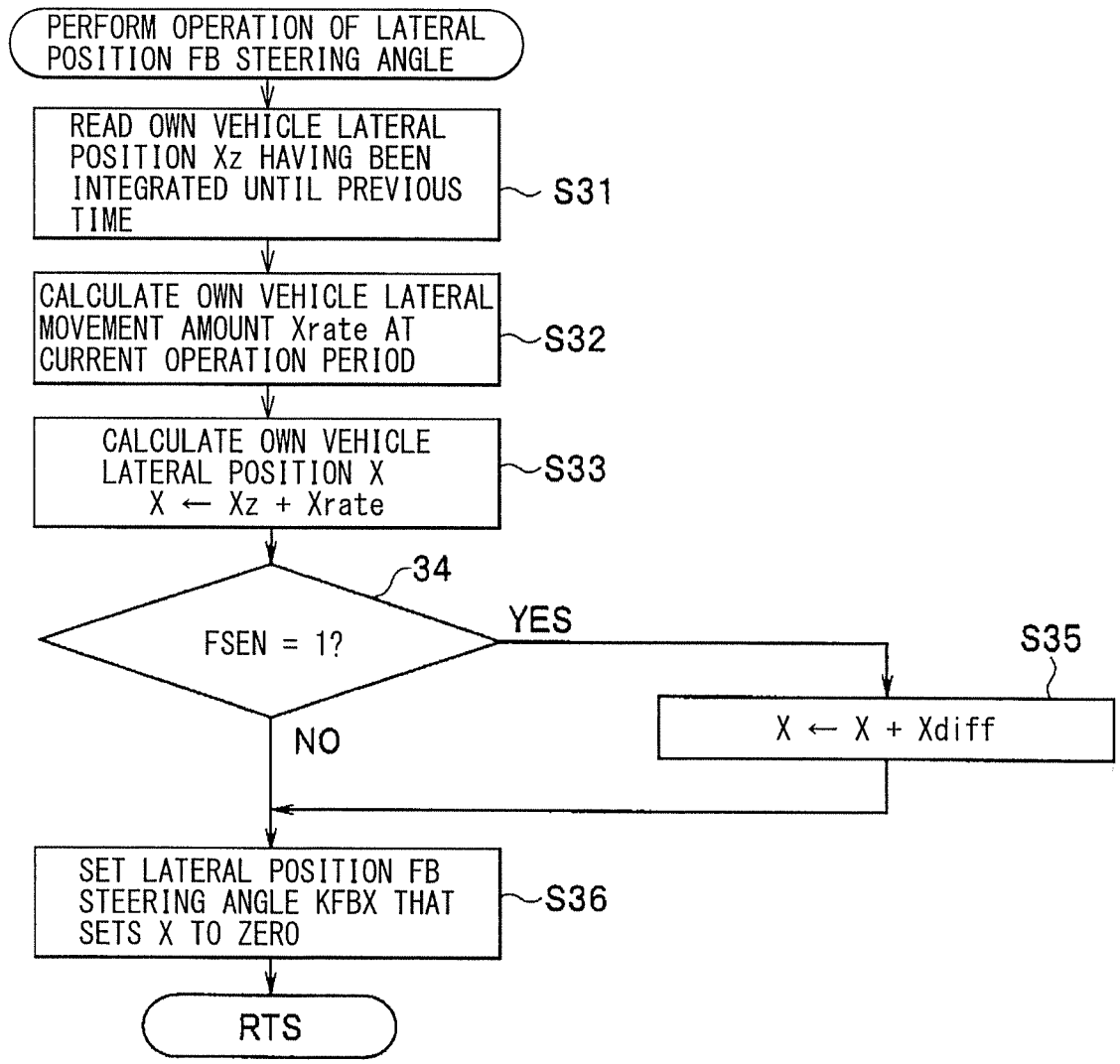
FIG. 5 is a flowchart illustrating an example of an operation sub-routine of a lateral position FB steering angle.

The operation processing of the lateral position FB steering angle in step S8 of FIG. 2 may be executed in accordance with an operation sub-routine of the lateral position FB steering angle illustrated in FIG. 5. In this sub-routine, the own vehicle position estimation operating unit 2 may first, in step S31, read an own vehicle lateral position Xz having been integrated until the time of the previous operation. Referring to FIG. 8, the own vehicle lateral position Xz is an integral of a position coordinate of the middle of the lane on the map, as the original of the lateral position, over the operation period. The position coordinate of the middle of the lane on the map may be set when executing the first routine at the time of the determination that the right and left lane lines are difficult to recognize or unrecognizable by the camera unit 16.

When the flow proceeds to step S32, the own vehicle position estimation operating unit 2 may calculate an own vehicle lateral movement amount Xrate on the map from the previous operation period to the current operation period, as illustrated in FIG. 8, on the basis of the information on the position of the own vehicle. The position of the own vehicle may be determined on the basis of the positioning signals received by the GNSS receiver 11. In step S33, the own vehicle position estimation operating unit 2 may calculate an own vehicle lateral position X by adding the own vehicle lateral movement amount Xrate to the own vehicle lateral position Xz.

Thereafter, when the flow proceeds to step S34, the own vehicle position estimation operating unit 2 may refer to a value of a preceding vehicle detection flag FSEN. In a case where the FSEN is equal to (=) zero (0), i.e., in a case of "NO" in step S34, the flow may proceed, as it is, to step S36. In a case where the FSEN is equal to (=) one (1), i.e., in a case of "YES" in step S34, the flow may branch to step S35. In a processing routine of lateral position correction illustrated in FIG. 6 described later, the preceding vehicle detection flag FSEN may be set in a case where a preceding vehicle to be followed is recognized and where an estimated lateral position deviation Xdiff is calculated. The preceding vehicle detection flag FSEN may be cleared in any one of cases where the right and left lane lines L are recognized by the camera unit 16, where the preceding vehicle P is not detected, and where detected preceding vehicle P fails to travel stably.

When the flow branches to step S35, the own vehicle position estimation operating unit 2 may update the own vehicle lateral position X with a value of addition of the estimated lateral position deviation Xdiff to the own vehicle lateral position X, i.e. X←X+Xdiff. Thereafter, the flow may proceed to step S36. The estimated lateral position deviation Xdiff may be set in step S50 in FIG. 6 described later. The estimated lateral position deviation Xdiff is described later in detail.

When the flow proceeds to step S36, the own vehicle position estimation operating unit 2 may set a lateral position FB steering angle KFBx by means of a method such as the known PID control, for example. The lateral position FB steering angle KFBx may be used to set the own vehicle lateral position X to zero (0). Thereafter, when the flow proceeds to step S9 in FIG. 2, the own vehicle position estimation operating unit 2 may execute a processing of target steering angle setting to exit the routine.

[Processing of Target Steering Angle Setting]

In step S9 in FIG. 2, steering angles of a feedforward control system and a feedback control system that are related to traveling control, such as steering angles KFF, KFBy, and KFBx may be each multiplied by a predeterminedly weighted gain. Further, the resulting multiplied values may be added together to set the target steering angle δT that allows the own vehicle M to travel along the middle of the traveling lane. Thereafter, the flow may exit the routine.

The target steering angle δT may be read by a steering controller 21a provided in the steering control unit 21. The steering controller 21a may set, on the basis of the target steering angle δT, electric power steering (EPS) additive torque by means of an operation or by referring to an EPS motor output map. The EPS additive torque may drive an unillustrated EPS motor that drives a steering shaft. The thus-set EPS additive torque may drive and control the unillustrated EPS motor to allow the own vehicle M to travel along the target advancing course set in the middle of the traveling lane.

[Processing Routine of Lateral Position Correction]

Referring to FIG. 9, the right and left lane lines L, i.e., the right lane line Lr and the left lane line Ll may be concealed by a factor such as stacked snow as a result of snow removal on a road or may be blurred due to deterioration. The right and left lane lines L may partition, on the right and on the left, the lane along which the own vehicle M travels. In this situation, the right and left lane lines L are difficult to recognize or unrecognizable on the basis of front images captured by the camera unit 16 due to the concealed or blurred right and left lane lines L. In such a case, in the present implementation, the radio navigation may be basically used in accordance with the operation routine of the above-described lane keep assist target steering angle illustrated in FIG. 2 to allow the own vehicle M to travel along the target advancing course set on the road map. The radio navigation may use the road map information and the own vehicle position determined on the basis of positioning signals received by the GNSS receiver 11.

In this case, the radio navigation may perform the steering control to allow the own vehicle M to travel along the target advancing course set on the map. Accordingly, it is unclear to what degree the lateral position is offset from the middle of the traveling lane along which the own vehicle M actually travels. Hence, in the above-described operation sub-routine of the lateral position FB steering angle illustrated in FIG. 5, the integral of the own vehicle lateral movement amount Xrate over the operation period allows for estimation of the own vehicle lateral position X toward the target advancing course on the map. The feedback control of the own vehicle lateral position X to be zero (0) allows for correction of the offset toward a lateral position direction.

However, integral error may possibly be included in the thus estimated own vehicle lateral position X. As integral time becomes longer, the error may be accumulated more in response to the integral time. Moreover, as the error becomes larger, the lane keep assist control may become unstable, thus causing a driver to perform steering intervention, i.e., steering override to return the own vehicle M toward the middle of the lane, which leads to cancellation of the automatic driving. In this case, even in a circumstance where the right and left lane lines L are difficult to recognize or unrecognizable, if the influence due to the integral error in the own vehicle lateral position X is corrected, it becomes possible to continue the lane keep assist control performed by the automatic driving, for example, in a traveling environment of intermittent section where the right and left lane lines L are difficult to recognize or unrecognizable.

Accordingly, in the present implementation, in a case where a preceding vehicle P to be followed is recognized in the lateral position correction processor 2c, when a difference between the preceding vehicle curvature RSEN and the map curvature RMPU is equal to or smaller than a predetermined value, the estimated lateral position deviation Xdiff corresponding to the difference may be determined. Note that the preceding vehicle curvature RSEN may be the curvature determined by a traveling trajectory of the preceding vehicle P, and that the estimated lateral position deviation Xdiff may be an amount of shift in a lateral direction orthogonal to the advancing direction. In the above-described step S35 in FIG. 5, the own vehicle lateral position X may be updated with a value in which the estimated lateral position deviation Xdiff is added to the own vehicle lateral position X, thereby substantially correcting the integral error in the own vehicle lateral position X to continue the lane keep assist control.

Figure 6:
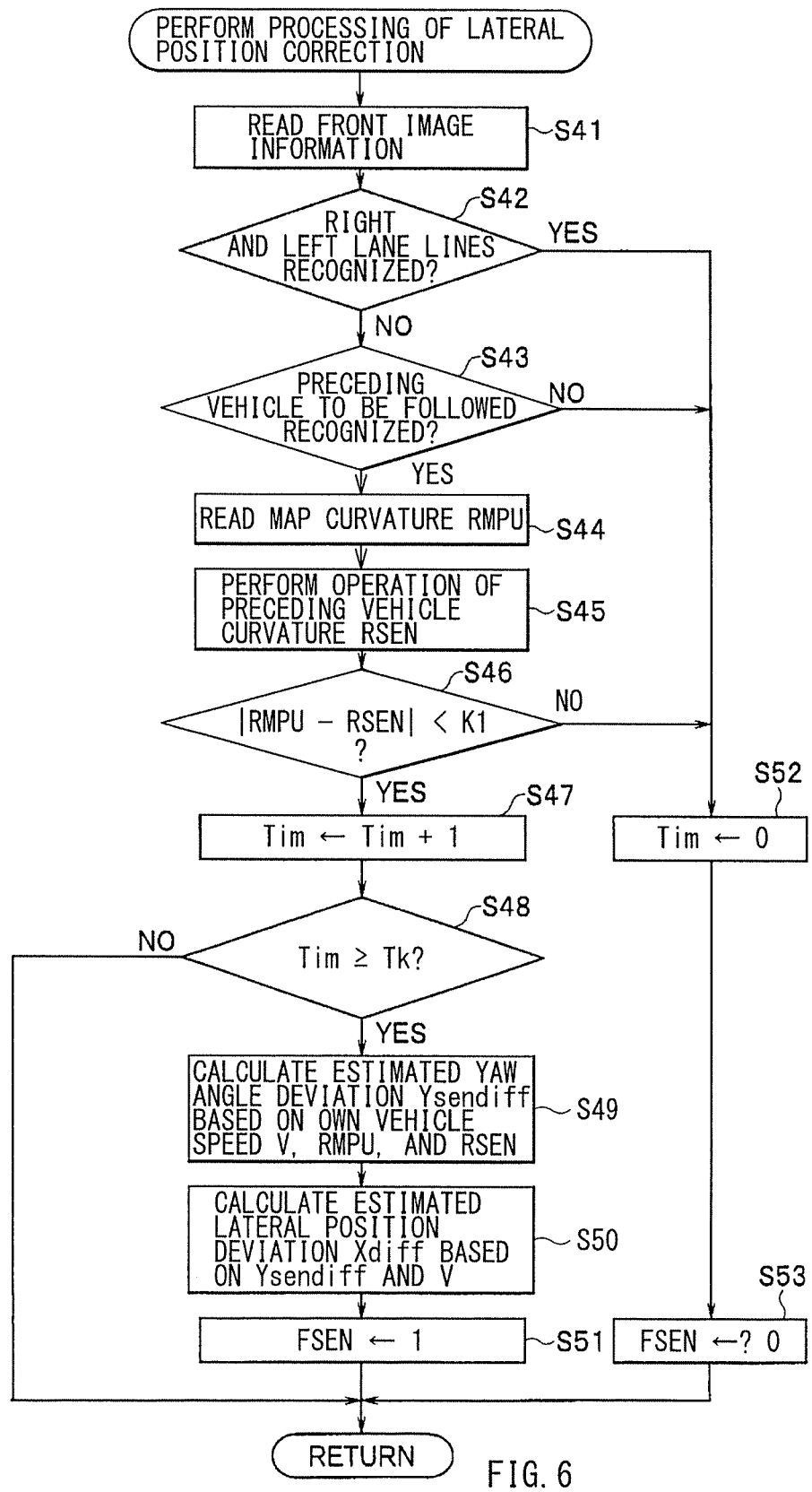
FIG. 6 is a flowchart illustrating an example of a processing routine of lateral position correction.

In a specific but non-limiting example, the estimated lateral position deviation Xdiff determined by the lateral position correction processor 2c may be calculated in accordance with the processing routine of the lateral position correction illustrated in FIG. 6. In this routine, the own vehicle position estimation operating unit 2 may first, in step S41, read the information on the front images ahead of the own vehicle M captured by the camera unit 16. Thereafter, in step S42, the own vehicle position estimation operating unit 2 may check, on the basis of the information on the front images, whether the right and left lane lines L are recognized. The right and left lane lines L partition, on the right and on the left, the traveling lane. In a case where the right and left lane lines L are recognized, i.e., in a case of "YES" in step S42, the flow may jump to step S52. In a case where the right and left lane lines L are not recognized, i.e., in a case of "NO" in step S42, the flow may proceed to step S43. In step S43, the own vehicle position estimation operating unit 2 may check whether the preceding vehicle P to be followed and traveling ahead of the own vehicle M is recognized. In a case where the preceding vehicle P is not recognized, i.e., in a case of "NO" in step S43, the flow may jump to step S52.

In a case where the preceding vehicle P to be followed is recognized, i.e., in a case of "YES" in step S43, the flow may proceed to step S44. In step S44 and steps thereafter, the own vehicle position estimation operating unit 2 may check whether the target advancing course of the own vehicle M is to be corrected on the basis of the traveling trajectory of the preceding vehicle P.

For example, in step S44, the own vehicle position estimation operating unit 2 may read the curvature of a road along which the own vehicle M travels on the map, i.e., the map curvature RMPU. In step S45, the own vehicle position estimation operating unit 2 may determine the preceding vehicle curvature RSEN on the basis of the traveling trajectory of the preceding vehicle P, i.e., a preceding vehicle trajectory. The preceding vehicle curvature RSEN may be determined by performing curve approximation of a trajectory of the middle of a rear surface of the preceding vehicle P in the vehicle-width direction by means of a least square method. The middle of the rear surface of the preceding vehicle P may be captured by the camera unit 16, for example. In one implementation, the processing in step S45 may correspond to that of a "preceding vehicle curvature operating unit".

Thereafter, when the flow proceeds to step S46, the own vehicle position estimation operating unit 2 may compare an absolute value |RMPU−RSEN| and an acceptable value K1 with each other. The absolute value |RMPU−RSEN| may be a difference, i.e., a curvature difference between the map curvature RMPU and the preceding vehicle curvature RSEN. The acceptable value K1 may be a threshold value used to check whether the preceding vehicle P is changing courses significantly with reference to a behavior of the own vehicle M. In a case where the absolute value |RMPU−RSEN| is smaller than K1 (|RMPU−RSEN|<K1), i.e., in a case of "YES" in step S46, the own vehicle position estimation operating unit 2 may determine that the preceding vehicle P has not changed courses significantly. The flow thereafter may proceed to step S47. In a case where the absolute value |RMPU−RSEN| is equal to or larger than K1 (|RMPU−RSEN|≥K1), i.e., in a case of "NO" in step S46, the own vehicle position estimation operating unit 2 may determine that the preceding vehicle P has changed courses significantly. The flow may thereafter branch to step S52.

Figure 11:
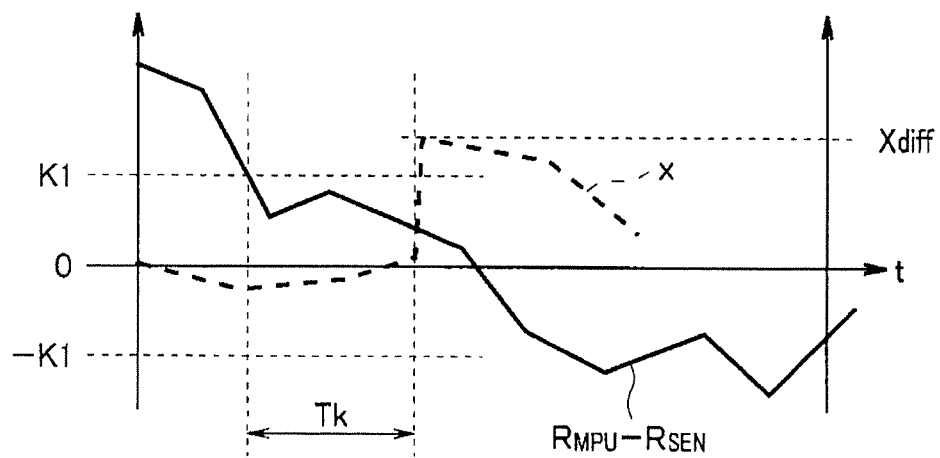
FIG. 11 is a time chart illustrating an example of a timing at which the lateral position correction of the own vehicle is performed.

When the flow proceeds to step S47, the own vehicle position estimation operating unit 2 may increment measurement time Tim (i.e., Tim←Tim+1). In step S48, the own vehicle position estimation operating unit 2 may check whether the measurement time Tim elapses by set time Tk. The set time Tk may be a threshold value used to determine whether the preceding vehicle P is traveling stably. The set time Tk may be, for example, about 5 [sec] to about 10 [sec]. However, the set time Tk is not limited thereto. In a case where Tim is smaller than Tk (Tim<Tk), i.e., in a case of "NO" in step S48, the flow may exit the routine as it is, because the measurement is under way. In a case where Tim is equal to or larger than Tk (Tim≥Tk), i.e., in a case of "YES" in step S48, the own vehicle position estimation operating unit 2 may determine that the preceding vehicle P is traveling stably. The flow may thereafter proceed to step S49. Accordingly, as illustrated in FIG. 11, in a case where the difference between the map curvature RMPU and the preceding vehicle curvature RSEN (RMPU−RSEN) is within an acceptable range (i.e., −K1<RMPU−RSEN<K1) and where the measurement time Tim continues more than the set time Tk or longer, the own vehicle position estimation operating unit 2 may determine that the preceding vehicle P is traveling stably.

In step S49, the own vehicle position estimation operating unit 2 may calculate a road direction deviation, i.e., an estimated yaw angle deviation Ysendiff [rad] using the following expression:

$$Ysendiff \leftarrow \int V \cdot Ts \cdot (RMPU - RSEN) dt$$

where Ts denotes a sampling period, i.e., an operation period. The calculation may be performed on the basis of an angle generated by a difference, i.e., a curvature difference between the map curvature RMPU and the preceding vehicle curvature RSEN. In other words, the calculation may be performed on the basis of a deviation in an orientation of the preceding vehicle P caused by the difference between the preceding vehicle curvature RSEN and the map curvature RMPU.

Thereafter, when the flow proceeds to step S50, the own vehicle position estimation operating unit 2 may calculate the estimated lateral position deviation Xdiff [m] on the basis of the estimated yaw angle deviation Ysendiff and the own vehicle speed V, using the following expression.

$$Xdiff \leftarrow \int V \cdot Ts \cdot \sin(Ysendiff) dt$$

The estimated lateral position deviation Xdiff may be used to offset the own vehicle lateral position X on the map to the traveling trajectory of the preceding vehicle P. In the above-described step S35 in FIG. 5, the estimated lateral position deviation Xdiff may be added to the own vehicle lateral position X to update this own vehicle lateral position X. Note that, in one implementation, the processings in steps S49 and S50 may correspond to those of a "lateral position deviation calculator".

Thereafter, when the flow proceeds to step S51, the preceding vehicle detection flag FSEN may be set (FSEN←1), and the flow may exit the routine. Meanwhile, the flow may branch from step S42, S43, or S46 to step S52, the measurement time Tim may be cleared. In step S53, the preceding vehicle detection flag FSEN may be cleared (FSEN←0), and the flow may exit the routine.

Accordingly, in a case where the own vehicle position estimation operating unit 2 determines that the preceding vehicle P is traveling stably, a feedback control may be performed to allow the difference in lateral positions between the lateral position of the own vehicle M and the trajectory of the preceding vehicle P to be zero (0) in the operation sub-routine of the lateral position FB steering angle illustrated in FIG. 5. As a result, even in a circumstance where the right and left lane lines L are difficult to recognize or unrecognizable by the camera unit 16, when the own vehicle position estimation operating unit 2 determines that the preceding vehicle P is traveling stably, the target advancing course of the own vehicle M may be set along the traveling trajectory of the preceding vehicle P, i.e., the preceding vehicle trajectory as illustrated in FIG. 10. Thus, the integral error in the own vehicle lateral position X is corrected. As a result, it becomes possible to continue the lane keep assist control performed by the automatic driving in a relaxed state of a driver without imposing burden on the driver.

Referring to FIG. 10, for example, in a case where the left lane line Ll is covered with stacked snow having been cleared as a result of snow removal on a road, a driver in manual driving drives the own vehicle M in a state slightly closer to side of the right lane line Lr to avoid the stacked snow. Meanwhile, the radio navigation does not recognize the left lane line Ll, and thus may possibly attempt to cause the own vehicle M to travel in the middle of the lane on the map. In such a case, when the own vehicle M recognizes that the preceding vehicle P to be followed is traveling stably, setting the target advancing course of the own vehicle M along the traveling trajectory of the preceding vehicle P makes it possible to continue the lane keep assist control of the own vehicle M in a stable state.

[Second Implementation]

Figure 12:
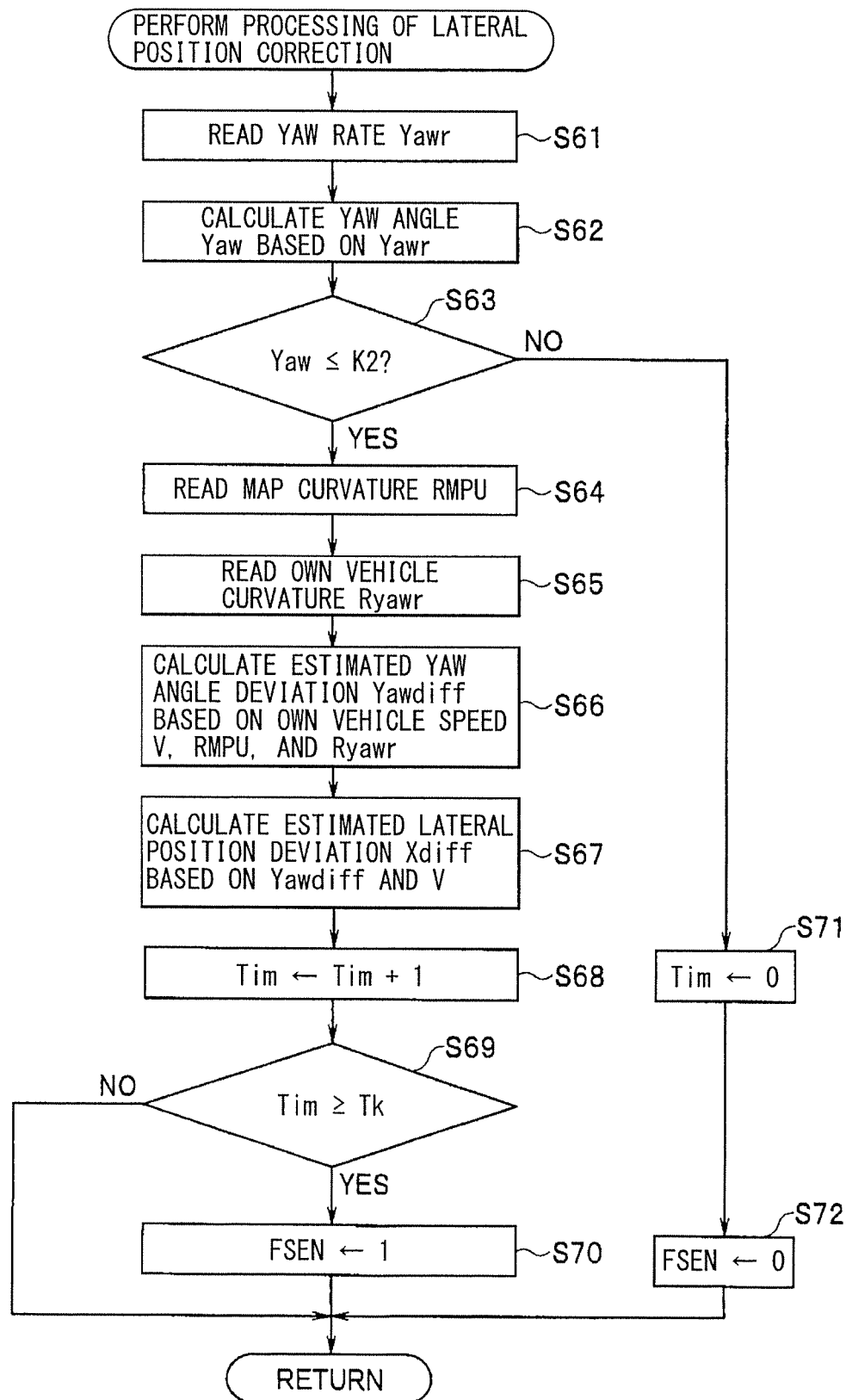
FIG. 12 is a flowchart illustrating an example of a processing routine of lateral position correction according to one implementation.
Figure 13:
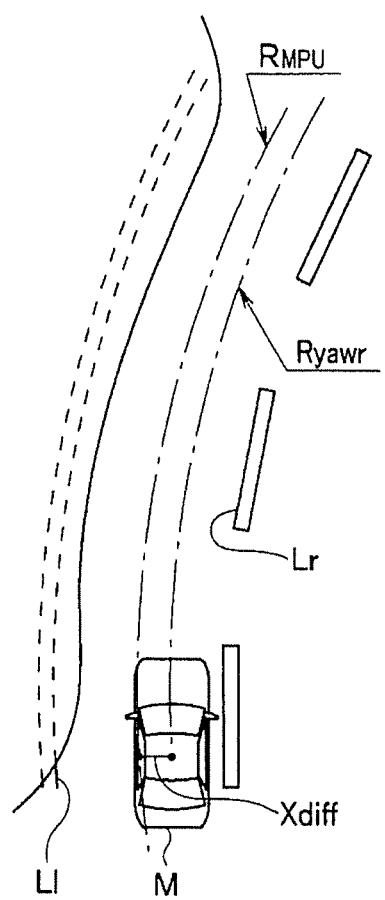
FIG. 13 describes an example of the lateral position correction of the lane keep assist control based on steering of the driver.
Figure 14:
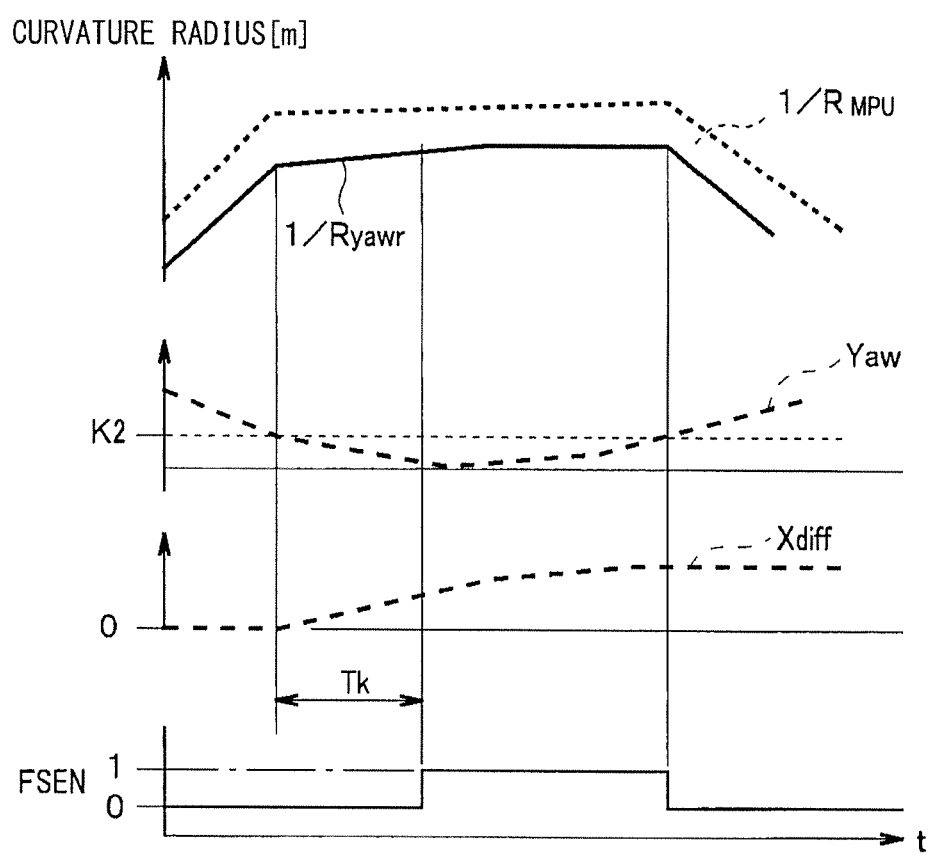
FIG. 14 is a time chart illustrating an example of a timing at which the lateral position correction of the own vehicle is performed.

FIGS. 12 to 14 illustrate a second implementation of the technology. Note that description is given hereinafter by reading the preceding vehicle detection flag FSEN as a course change detection flag FSEN for the sake of convenience.

In the foregoing first implementation, in a case where the right and left lane lines L are difficult to recognize or unrecognizable by the camera unit 16, the integral error in the own vehicle lateral position X caused by the radio navigation may be cleared by correcting the target advancing course of the own vehicle M on the basis of the traveling trajectory of the preceding vehicle P. The right and left lane lines L, i.e., the right lane line Lr and the left lane line Ll may partition, on the right and on the left, the traveling lane. In the lateral position correction processor 2c according to the present implementation, however, the integral error in the own vehicle lateral position X may be corrected by adding an offset amount by a steering operation of a driver. The steering operation of a driver may be an external factor related to the lane traveling.

In a specific but non-limiting example, a processing of lateral position correction executed by the lateral position correction processor 2c may be performed in accordance with a processing routine of lateral position correction illustrated in FIG. 12. Note that this routine may be applied instead of the routine illustrated in FIG. 6 of the first implementation.

This routine may be started, for example, when the steering operation of the driver is detected during the automatic driving, on the basis of steering torque detected by the steering torque sensor 14. The own vehicle position estimation operating unit 2 may first, in step S61, read the yaw rate Yawr detected by the yaw rate sensor 12. In step S62, the own vehicle position estimation operating unit 2 may calculate a yaw angle Yaw by integrating the yaw rate Yawr. In step S63, the own vehicle position estimation operating unit 2 may compare the yaw angle Yaw and a set threshold value K2 with each other. The set threshold value K2 may be a value used to determine whether the steering operation is a quick steering operation performed by the driver or a slight steering operation. The set threshold value K2 may be determined and set in advance on the basis of experiments, for example. The quick steering operation may be performed by the driver to change lanes or to avoid an obstacle, and the slight steering operation may be performed to displace the target advancing course from the middle of the lane to one side of the lane. In a case where Yaw is larger than K2 (Yaw>K2), i.e., in a case of "NO" in step S63, the own vehicle position estimation operating unit 2 may determine that the steering operation is the quick steering operation, and the flow may branch to step S71. In step S71, the measurement time Tim may be cleared. In step S72, the course change detection flag FSEN may be cleared (FSEN←0), and the flow may exit the routine.

Meanwhile, in a case where Yaw is equal to or smaller than K2 (Yaw≤K2), i.e., in a case of "YES" in step S63, the own vehicle position estimation operating unit 2 may determine that the steering operation is the slight steering operation, and the flow may proceed to step S64. In step S64, the own vehicle position estimation operating unit 2 may read the map curvature RMPU from the lane data of the road along which the own vehicle M is traveling currently. In subsequent step S65, the own vehicle position estimation operating unit 2 may read the own vehicle curvature, i.e., the turning curvature Ryawr (i.e., Ryawr←Yawr/V) determined by dividing the yaw rate Yawr by the own vehicle speed V.

Thereafter, when the flow proceeds to step S66, the own vehicle position estimation operating unit 2 may calculate an estimated yaw angle deviation Yawdiff on the basis of the own vehicle speed V, the map curvature RMPU, and the turning curvature Ryawr, using the following expression:

$$\text{Yawdiff} \leftarrow \int V \cdot Ts \cdot (RMPU - Ryawr) dt$$

where Ts denotes a sampling period [sec]. A case where a subtraction of Ryawr from RMPU is larger than zero (0), i.e., a case of (RMPU−Ryawr)>0 may indicate a state where the own vehicle M is turning on an outer side of a curve toward the target advancing course on the map. A case where a subtraction of Ryawr from RMPU is smaller than zero (0), i.e., a case of (RMPU−Ryawr)<0 may indicate a state where the own vehicle M is turning on an inner side of the curve.

Thereafter, when the flow proceeds to step S67, the own vehicle position estimation operating unit 2 may calculate the estimated lateral position deviation Xdiff [m] on the basis of the estimated yaw angle deviation Yawdiff and the own vehicle speed V, using the following expression.

$$X\text{diff} \leftarrow \int V \cdot Ts \cdot \sin(Yaw\text{diff}) dt$$

In step S68, the own vehicle position estimation operating unit 2 may increment the measurement time Tim of a timer (i.e., Tim←Tim+1). When the flow proceeds to step S69, the own vehicle position estimation operating unit 2 may compare the measurement time Tim and the set time Tk with each other to check whether the slight steering operation continues for the set time Tk or longer. The set time Tk may be a threshold value used to determine whether the driver continues to perform the steering operation. The set time Tk may be, for example, about 3 [sec] to about 5 [sec]. However, the set time Tk is not limited thereto.

In a case where Tim is smaller than Tk (Tim<Tk), i.e., in a case of "NO" in step S69, the flow may exit the routine as it is. In a case where Tim reaches or goes beyond Tk (Tim≥Tk), i.e., in a case of "YES" in step S69, the own vehicle position estimation operating unit 2 may determine that the driver continues to perform the steering operation, and the flow may proceed to step S70. In step S70, the own vehicle position estimation operating unit 2 may set the course change detection flag FSEN (FSEN←1), and the flow may exit the routine.

The above-described estimated lateral position deviation Xdiff [m] may be used to offset the own vehicle lateral position X on the map to a selected advancing course by a steering operation of the driver. The estimated lateral position deviation Xdiff [m] may be read in the above-described step S35 in FIG. 5 in a case where the course change detection flag FSEN is set, and may be added to the own vehicle lateral position X to set a new own vehicle lateral position X.

Referring to FIG. 14, in a case where the driver attempts to change the advancing course of the own vehicle M in a curved route, the driver may first turn a steering wheel to allow the own vehicle M to move laterally, and thereafter may steer the own vehicle M to travel along the curved route. Accordingly, the yaw angle Yaw may possibly vary significantly immediately after the course change. In traveling along the curved route after the course change, the yaw angle Yaw may possibly remain substantially constant along the curvature. In a case where the driver attempts to return the steering wheel to travel along the original advancing course, the yaw angle Yaw may possibly vary significantly again. Note that, in FIG. 14, the map curvature RMPU [1/m] and the turning curvature Ryawr [1/m] are each represented by a unit of curvature radius [m] for the sake of easy description.

In a case where the yaw angle Yaw in the traveling along the curved route after the course change is equal to or smaller than the set threshold value K2 and where such a state continues for the set time Tk, the own vehicle position estimation operating unit 2 may determine that the driver has changed the advancing course on the driver's own will. The own vehicle position estimation operating unit 2 may thereafter add the estimated lateral position deviation Xdiff to the own vehicle lateral position X in step S35 in FIG. 5 to set the new own vehicle lateral position X until detection of a behavior, caused by a steering operation of the driver, at which the yaw angle Yaw goes beyond the set threshold value K2. As a result, as illustrated in FIG. 13, it becomes possible to allow the own vehicle M to travel along a course based on the own vehicle curvature Ryawr that is offset by the estimated lateral position deviation Xdiff from the original course based on the map curvature RMPU in the curved route. In other words, it is possible to allow the own vehicle M to travel along an advancing course set by the driver. In a straight route as well, it is possible to continue the traveling along the advancing course set by the driver until generation of the yaw angle Yaw, caused by a steering operation of the driver, that goes beyond the set threshold value K2.

Accordingly, as illustrated in FIG. 13, in a case where a factor such as stacked snow overflowed from the left lane line Ll toward the traveling lane prevents traveling, the radio navigation does not recognize the stacked snow that prevents the own vehicle M from advancing, thus attempting to cause the own vehicle M to travel in the middle of the traveling lane. In the present implementation, however, offsetting may be performed to allow the own vehicle M to travel along the course based on a curvature of the own vehicle M, i.e., the own vehicle curvature Ryawr in a case where a course change made by a steering operation of the driver satisfies a preset condition. Hence, it is possible to continue the lane keep assist control performed by the automatic driving longer, thus making it possible to reduce burden on the driver.

Note that the technology is not limited to the foregoing example implementations. For example, the lateral position correction processor 2c may continue the lane keep assist control by using, in combination, the processing routine of the lateral position correction illustrated in FIG. 6 of the first implementation and the processing routine of the lateral position correction illustrated in FIG. 12 of the second implementation.

According to one implementation of the technology, the lateral position deviation that is an offset amount in the lateral direction orthogonal to the advancing direction of the own vehicle is set on the basis of an external factor related to lane traveling. The lateral position deviation is to be added to the feedback term of the target steering angle set by the target steering angle setting unit. The lateral position deviation is added to the feedback term of the target steering angle to set the target steering angle that allows the own vehicle to travel along the traveling lane. Hence, it becomes possible to continue the lane keep assist control without imposing burden on the driver even in a circumstance where the right and left lane lines of the traveling lane are difficult to recognize or unrecognizable by the front recognizer.

The own vehicle position estimation operating unit 2 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the own vehicle position estimation operating unit 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the own vehicle position estimation operating unit 2 illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle drive assist apparatus comprising:
an own vehicle position estimator configured to estimate an own vehicle position that is a position of an own vehicle, by receiving a positioning signal supplied from a positioning information transmitter;
a storage that stores road map information;
a traveling lane estimator configured to estimate a traveling lane along which the own vehicle travels, by referring to the road map information stored in the storage and on a basis of the own vehicle position estimated by the own vehicle position estimator;
a target steering angle setting unit configured to set a target steering angle on a basis of the traveling lane estimated by the traveling lane estimator, the target steering angle allowing the own vehicle to travel along the traveling lane;
an own vehicle speed detector configured to detect an own vehicle speed of the own vehicle;
a lateral position deviation calculator configured to set a lateral position deviation on a basis of an external factor related to lane traveling, the lateral position deviation being an offset amount in a lateral direction orthogonal to an advancing direction of the own vehicle and being to be added to a feedback term of the target steering angle;
a preceding vehicle information obtaining unit configured to obtain a traveling trajectory of a preceding vehicle traveling ahead on the traveling lane along which the own vehicle travels; and
a preceding vehicle curvature operating unit configured to determine a curvature of the traveling trajectory on a basis of the traveling trajectory obtained by the preceding vehicle information obtaining unit, wherein
the traveling trajectory obtained by the preceding vehicle information obtaining unit is the external factor related to the lane traveling,
the lateral position deviation calculator determines the lateral position deviation on a basis of difference between a curvature of the traveling lane on a map and the curvature of the traveling trajectory and on a basis of the own vehicle speed detected by the own vehicle speed detector,
the curvature of the traveling lane on the map is read from the road map information, and
the target steering angle setting unit adds the lateral position deviation to the feedback term of the target steering angle, and sets, on a basis of a result of the addition, the target steering angle that allows the own vehicle to travel along the traveling trajectory of the preceding vehicle.

2. The vehicle drive assist apparatus according to claim 1, further comprising an own vehicle curvature calculator configured to calculate a curvature of the own vehicle generated by a steering operation performed by a driver, wherein
the curvature of the own vehicle generated by the steering operation is the external factor related to the lane traveling,
the curvature of the own vehicle generated by the steering operation indicates a turning curvature at which the own vehicle turns by the steering operation performed by the driver,
the lateral position deviation calculator determines the lateral position deviation on a basis of difference between the curvature of the traveling lane on a map and the curvature of the own vehicle and on the basis of the own vehicle speed detected by the own vehicle speed detector,
the curvature of the traveling lane on the map is read from the road map information,
the curvature of the own vehicle is calculated by the own vehicle curvature calculator, and
the target steering angle setting unit sets the target steering angle that allows the own vehicle to travel along the traveling lane, by setting, on the basis of the result of the addition, the target steering angle to allow the own vehicle to travel along an advancing course set by the steering operation.

3. The vehicle drive assist apparatus according to claim 1, wherein when the difference between the curvature of the traveling lane on a map and the curvature of the traveling trajectory is within a predetermined range, the target steering angle setting unit adds the lateral position deviation to the feedback term of the target steering angle.

4. A vehicle drive assist apparatus comprising;
an own vehicle position estimator configured to estimate an own vehicle position that is a position of an own vehicle, by receiving a positioning signal supplied from a positioning information transmitter;
a storage that stores road map information;
a traveling lane estimator configured to estimate a traveling lane along which the own vehicle travels, by referring to the road map information stored in the storage and on a basis of the own vehicle position estimated by the own vehicle position estimator;
a target steering angle setting unit configured to set a target steering angle on a basis of the traveling lane estimated by the traveling lane estimator, the target steering angle allowing the own vehicle to travel along the traveling lane;
an own vehicle speed detector configured to detect an own vehicle speed of the own vehicle;
a lateral position deviation calculator configured to set a lateral position deviation on a basis of an external factor related to lane traveling, the lateral position deviation being an offset amount in a lateral direction orthogonal to an advancing direction of the own vehicle and being to be added to a feedback term of the target steering angle; and
an own vehicle curvature calculator configured to calculate a curvature of the own vehicle generated by a steering operation performed by a driver, wherein
the curvature of the own vehicle generated by the steering operation is the external factor related to the lane traveling,
the curvature of the own vehicle generated by the steering operation indicates a turning curvature at which the own vehicle turns by the steering operation performed by the driver,
the lateral position deviation calculator determines the lateral position deviation on a basis of difference between the curvature of the traveling lane on a map and the curvature of the own vehicle and on the basis of the own vehicle speed detected by the own vehicle speed detector, the curvature of the traveling lane on the map is read from the road map information, and
the target steering angle setting unit adds the lateral position deviation to the feedback term of the target steering angle, and sets, on a basis of a result of the addition, the target steering angle that allows the own vehicle to travel along.

5. The vehicle drive assist apparatus according to claim 4, wherein when a yaw angle of the own vehicle is equal to or smaller than a predetermined range, the target steering angle setting unit adds the lateral position deviation to the feedback term of the target steering angle.

6. The vehicle drive assist apparatus according to claim 4, wherein the turning curvature of the own vehicle generated by the steering operation is calculated based on at least the own vehicle speed of the own vehicle detected by the own vehicle speed detector.

7. A vehicle drive assist apparatus comprising:
a storage that stores road map information;
an own vehicle speed detector configured to detect an own vehicle speed of an own vehicle; and
circuitry configured to
estimate an own vehicle position that is a position of the own vehicle, by receiving a positioning signal supplied from a positioning information transmitter,
estimate a traveling lane along which the own vehicle travels, by referring to the road map information stored in the storage and on a basis of the estimated own vehicle position,
set a target steering angle on a basis of the estimated traveling lane, the target steering angle allowing the own vehicle to travel along the traveling lane,
set a lateral position deviation on a basis of an external factor related to lane traveling, the lateral position deviation being an offset amount in a lateral direction orthogonal to an advancing direction of the own vehicle and being to be added to a feedback term of the target steering angle,
obtain a traveling trajectory of a preceding vehicle traveling ahead on the traveling lane along which the own vehicle travels, and
determine a curvature of the traveling trajectory on a basis of the obtained traveling trajectory, wherein
the circuitry adds, upon the setting of the target steering angle, the lateral position deviation to the feedback term of the target steering angle, and sets, on a basis of a result of the addition, the target steering angle that allows the own vehicle to travel along the traveling trajectory of the preceding vehicle,
the traveling trajectory obtained by the circuitry is the external factor related to the lane traveling,
the circuitry determines the lateral position deviation on a basis of difference between a curvature of the traveling lane on a map and the curvature of the traveling trajectory and on a basis of the own vehicle speed detected by the own vehicle speed detector,
the curvature of the traveling lane on the map is read from the road map information, and
the target steering angle that allows the own vehicle to travel along the traveling lane is set on the basis of the result of the addition to allow the own vehicle to travel along the traveling trajectory of the preceding vehicle.

8. The vehicle drive assist apparatus according to claim 7, wherein when the difference between the curvature of the traveling lane on a map and the curvature of the traveling trajectory is within a predetermined range, the circuitry adds the lateral position deviation to the feedback term of the target steering angle.

9. A vehicle drive assist apparatus comprising:
a storage that stores road map information;
an own vehicle speed detector configured to detect an own vehicle speed of an own vehicle; and
circuitry configured to
estimate an own vehicle position that is a position of the own vehicle, by receiving a positioning signal supplied from a positioning information transmitter,
estimate a traveling lane along which the own vehicle travels, by referring to the road map information stored in the storage and on a basis of the estimated own vehicle position,
set a target steering angle on a basis of the estimated traveling lane, the target steering angle allowing the own vehicle to travel along the traveling lane,
set a lateral position deviation on a basis of an external factor related to lane traveling, the lateral position deviation being an offset amount in a lateral direction orthogonal to an advancing direction of the own vehicle and being to be added to a feedback term of the target steering angle,
calculate a curvature of the own vehicle generated by a steering operation performed by a driver, wherein
the curvature of the own vehicle generated by the steering operation is the external factor related to the lane traveling,
the curvature of the own vehicle generated by the steering operation indicates a turning curvature at which the own vehicle turns by the steering operation performed by the driver,
the circuitry determines the lateral position deviation on a basis of difference between the curvature of the traveling lane on a map and the curvature of the own vehicle and on the basis of the own vehicle speed detected by the own vehicle speed detector,
the curvature of the traveling lane on the map is read from the road map information, and
the circuitry adds the lateral position deviation to the feedback term of the target steering angle, and sets, on a basis of a result of the addition, the target steering angle that allows the own vehicle to travel along an advancing course set by the steering operation.

10. The vehicle drive assist apparatus according to claim 9, wherein when a yaw angle of the own vehicle is equal to or smaller than a predetermined range, the lateral position deviation is added to the feedback term of the target steering angle.

11. The vehicle drive assist apparatus according to claim 9, wherein the turning curvature of the own vehicle generated by the steering operation is calculated based on at least the own vehicle speed of the own vehicle detected by the own vehicle speed detector.

* * * * *